(12) United States Patent
Gautam et al.

(10) Patent No.: US 10,907,043 B2
(45) Date of Patent: *Feb. 2, 2021

(54) HIGH PERFORMANCE SULFONE POLYMER COMPOSITION

(71) Applicant: SOLVAY SPECIALTY POLYMERS USA, LLC, Alpharetta, GA (US)

(72) Inventors: Keshav Gautam, Duluth, GA (US); Mohammad Jamal El-Hibri, Atlanta, GA (US)

(73) Assignee: SOLVAY SPECIALTY POLYMERS USA, LLC, Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/915,764

(22) Filed: Mar. 8, 2018

(65) Prior Publication Data

US 2018/0258284 A1    Sep. 13, 2018

Related U.S. Application Data

(63) Continuation of application No. 14/366,777, filed as application No. PCT/EP2012/076017 on Dec. 18, 2012, now Pat. No. 9,938,408.

(60) Provisional application No. 61/578,331, filed on Dec. 21, 2011.

(51) Int. Cl.
   *C08L 81/06*   (2006.01)
   *C08K 7/14*    (2006.01)

(52) U.S. Cl.
   CPC ............ *C08L 81/06* (2013.01); *C08K 7/14* (2013.01); *Y10T 428/1314* (2015.01)

(58) Field of Classification Search
   CPC ................................. C08L 81/06; C08L 7/00
   See application file for complete search history.

(56) References Cited

U.S. PATENT DOCUMENTS

| | | |
|---|---|---|
| 4,624,997 A | 11/1986 | Robeson et al. |
| 4,713,426 A | 12/1987 | Harris et al. |
| 4,804,697 A | 2/1989 | Saito et al. |
| 4,908,427 A | 3/1990 | Rostami |
| 4,957,962 A | 9/1990 | Winkler et al. |
| 5,008,364 A | 4/1991 | Ittemann et al. |
| 5,916,958 A | 6/1999 | Kelly et al. |
| 2009/0048379 A1 | 2/2009 | Weinberg et al. |

FOREIGN PATENT DOCUMENTS

| | | |
|---|---|---|
| DE | 3843438 A1 | 6/1990 |
| DE | 19513403 A1 | 10/1996 |
| EP | 316681 A1 | 5/1989 |
| EP | 332012 A1 | 9/1989 |
| EP | 1884538 A1 | 2/2008 |
| EP | 2067823 A1 | 6/2009 |
| WO | 2007107519 A1 | 9/2007 |
| WO | 2008116939 A2 | 10/2008 |
| WO | 2009034086 A2 | 3/2009 |
| WO | 2009045431 A1 | 4/2009 |

OTHER PUBLICATIONS

ASTM D2343-09, Standard Test Method for Tensile Properties of Glass Fiber Strands, Yarns, and Rovings Used in Reinforced Plastics, 2009, 7 (8 pages).
"E-glass fibre", Jun. 10, 2011, XP055063906, retrieved from the Internet : URL:www.azom.com/article.aspx?ArticleID764‎.

*Primary Examiner* — Monique R Peets
(74) *Attorney, Agent, or Firm* — Beatrice C. Ortego

(57) ABSTRACT

The present invention relates to a polymer composition (C) comprising at least one polyaryletherketone (PAEK), at least one polyphenylsulfone (PPSU), at least one polysulfone (PSU) and glass fibers having an elastic modulus of at least 76 GPa as measured according to ASTM D2343. Polymer composition (C) is very well suited for the manufacture of articles useful in areas as various as plumbing and electronics.

19 Claims, No Drawings

HIGH PERFORMANCE SULFONE POLYMER COMPOSITION

This application claims priority to U.S. provisional application No. 61/578,331 filed Dec. 21, 2011, the whole content of each of these applications being incorporated herein by reference for all purposes.

TECHNICAL FIELD

The present invention relates to high performance sulfone polymer compositions and articles made there from. In particular, the present invention relates to composition comprising at least one polyaryletherketone (PAEK), at least one polyphenylsulfone (PPSU), at least one polysulfone (PSU), and certain reinforcing fillers.

BACKGROUND ART

Aromatic sulfone polymers [such as polyphenylsulfone (PPSU), polyethersulfone (PESU) and bisphenol A polysulfone (PSU)] have been widely used in applications where their outstanding properties have been valued. These properties include dimensional stability, low coefficient of thermal expansion, retention of modulus at high temperature, radiation resistance, hydrolytic stability and tough mechanical properties. Such applications include articles as various as plumbing, commercial aircraft interiors, cookware, wire insulation and food service articles. For instance, polyphenylsulfone (PPSU) is a commonly used polymer in applications such as plumbing, medical and aerospace applications.

On the other side, polyaryletherketones such as PEEK are one of the highest performing semi-crystalline thermoplastics available today featuring notably chemical resistance, excellent strength and superior fatigue resistance.

Certain PEEK-polyphenylsulfone blends offer a good and unique combination of properties and have been valued for years in specific end uses in particular in plumbing end-use applications such as fittings, tubes, manifolds etc.

However, even if the overall properties of those blends are exceptional, some failures have been detected when one assembles the fittings and tubes made of those blends: they sometime break when they are submitted to harsh stress conditions. There remains thus a need to improve the elongation at break and impact resistance of these materials to avoid the above mentioned issue.

SUMMARY OF INVENTION

The present invention thus relates to a polymer composition (C) comprising:
at least one polyaryletherketone (PAEK);
at least one polyphenylsulfone (PPSU);
at least one polysulfone (PSU); and
glass fibers having an elastic modulus of at least 76 GPa as measured according to ASTM D2343.

The Applicant has surprisingly found that the above mentioned polymer composition (C) features good elongation at break which renders the installation, assembly and use of articles made out of the polymer composition (C) very easy. In addition, polymer composition (C) features also high impact strength, high stiffness and very good chemical resistance. For all the above mentioned reasons, polymer composition (C) is a perfect candidate for the manufacture of articles used in plumbing, medical and aerospace applications.

DESCRIPTION OF PREFERRED EMBODIMENTS

The polymer composition (C) according to the present invention comprises thus at least three polymer components [the polyaryletherketone (PAEK), the polyphenylsulfone (PPSU), the polysulfone (PSU)] and a reinforcing filler (glass fibers having an elastic modulus of at least 76 GPa as measured according to ASTM D2343) that will be detailed hereafter.

The Polyaryletherketone

Firstly, the term "polyaryletherketone (PAEK)" is intended to denote for the purpose of the present invention any polymer, comprising recurring units, more than 50% moles of said recurring units are recurring units ($R_{PAEK}$) comprising a Ar—C(=O)—Ar' group, with Ar and Ar', equal to or different from each other, being aromatic groups. The recurring units ($R_{PAEK}$) are generally selected from the group consisting of formulae (J-A) to (J-O), herein below:

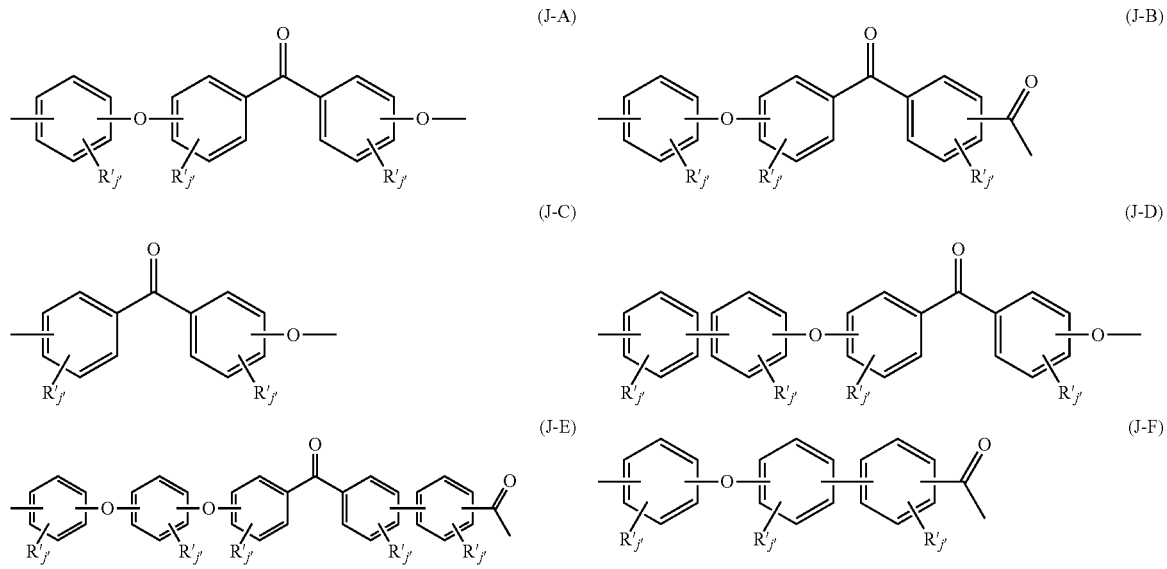

-continued
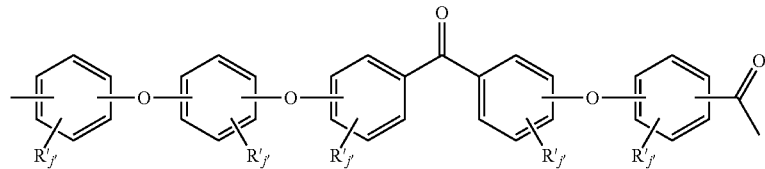
(J-G)
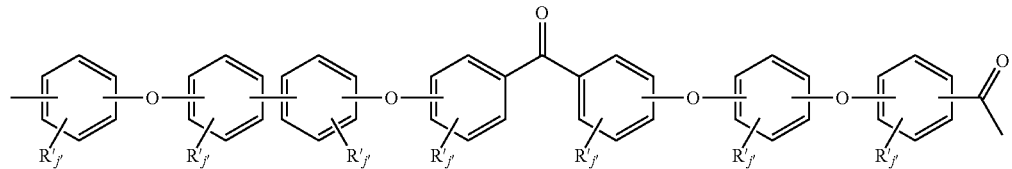
(J-H)
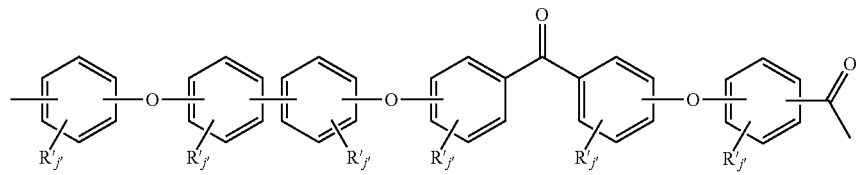
(J-I)
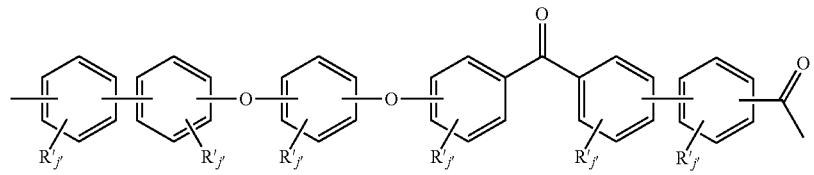
(J-J)
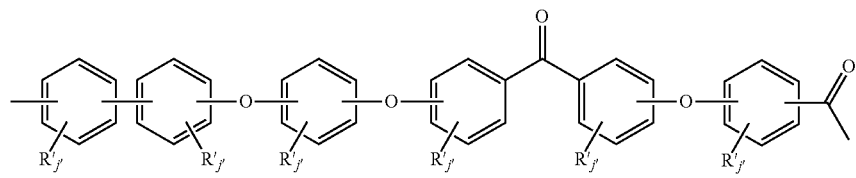
(J-K)
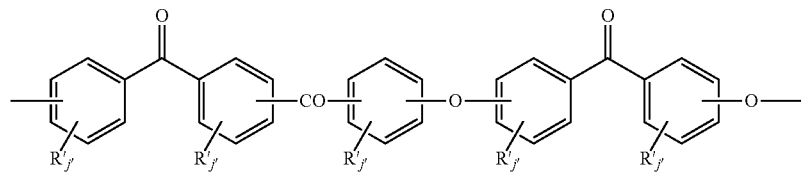
(J-L)
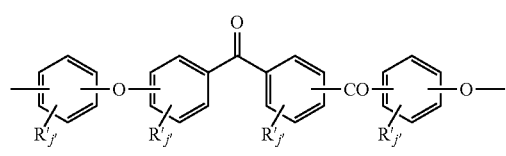
(J-M)
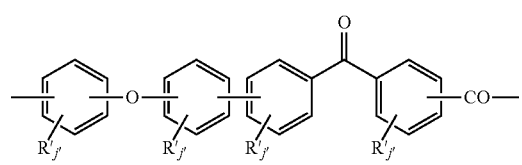
(J-N)
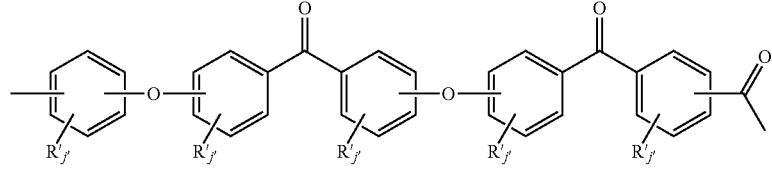
(J-O)

wherein:
  each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
  j' is zero or is an integer from 0 to 4.

In recurring unit ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK}$), j' is at each occurrence zero, that is to say that the phenylene moieties have no other substituents than those enabling linkage in the main chain of the polymer.

Preferred recurring units ($R_{PAEK}$) are thus selected from those of formulae (J'-A) to (J'-O) herein below:

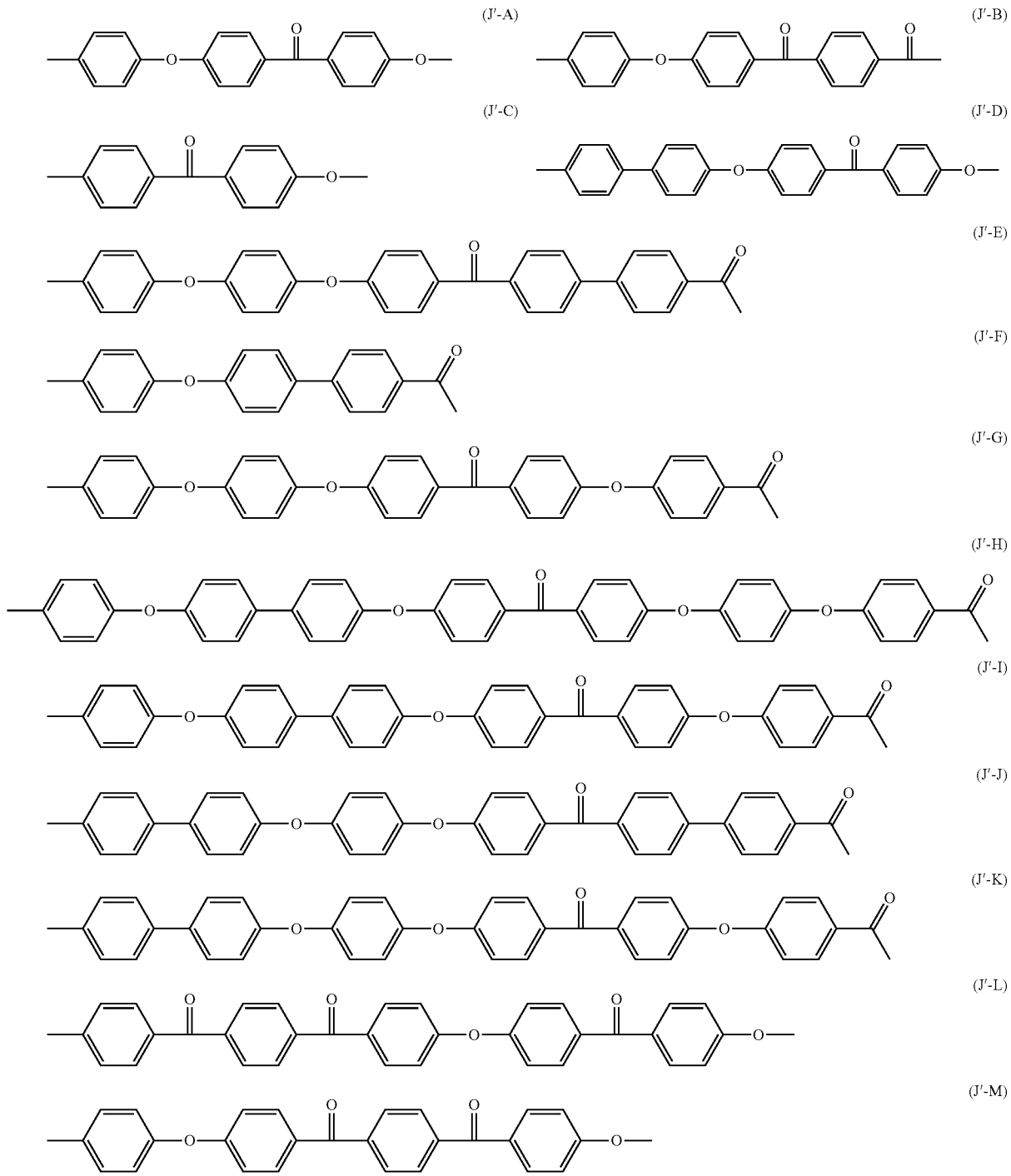

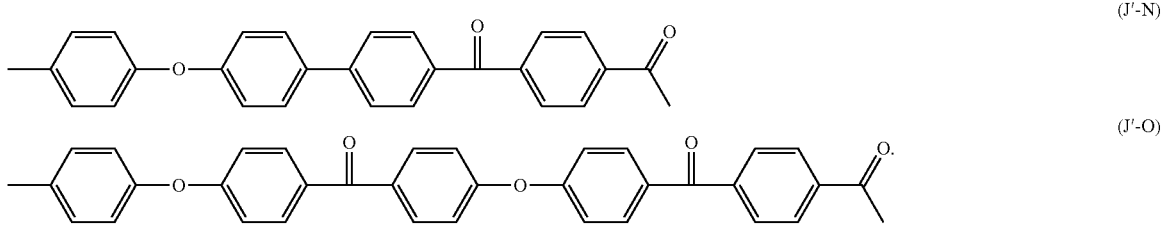

(J'-N)

(J'-O)

Polyaryletherketones (PAEK) are generally crystalline aromatic polymers, readily available from a variety of commercial sources. The polyaryletherketones (PAEK) have preferably reduced viscosities in the range of from about 0.8 to about 1.8 dl/g as measured in concentrated sulfuric acid at 25 C and at atmospheric pressure.

In a preferred embodiment of the invention, at least 50% moles of the recurring units of polyaryletherketones (PAEK) are recurring units (J'-A). Preferably at least 60% moles, more preferably at least 70% moles, still more preferably at least 80% moles and most preferably at least 90% moles of the recurring units of polyaryletherketones (PAEK) are recurring units (J'-A). Excellent results were obtained when the polyaryletherketones (PAEK) contained no recurring unit other than recurring units (J'-A).

In another preferred embodiment of the invention, at least 50% moles of the recurring units of polyaryletherketones (PAEK) are recurring units (J'-B). Preferably at least 60% moles, more preferably at least 70% moles, still more preferably at least 80% moles and most preferably at least 90% moles of the recurring units of polyaryletherketones (PAEK) are recurring units (J'-B). Excellent results were obtained when the polyaryletherketones (PAEK) contained no recurring unit other than recurring units (J'-B).

In yet another preferred embodiment of the invention, at least 50% moles of the recurring units of polyaryletherketones (PAEK) are recurring units (J'-C). Preferably at least 60% moles, more preferably at least 70% moles, still more preferably at least 80% moles and most preferably at least 90% moles of the recurring units of polyaryletherketones (PAEK) are recurring units (J'-C). Excellent results were obtained when the polyaryletherketones (PAEK) contained no recurring unit other than recurring units (J'-C).

Most preferably, the polyaryletherketone (PAEK) of the polymer composition (C) is polyetheretherketone (PEEK), i.e. a homopolymer of recurring units (F-A). Excellent results were obtained when using KETASPIRE® commercially available from Solvay Specialty Polymers USA, LLC.

In the polymer composition (C), the polyaryletherketone (PAEK) is present in an amount of advantageously at least 1 wt. %, at least 2 wt. %, at least 3 wt. %, at least 4 wt. %, at least 5 wt. %, at least 6 wt. %, at least 7 wt. %, at least 8 wt. %, at least 9 wt. %, at least 10 wt. %, at least 11 wt. %, at least 12 wt. %, at least 13 wt. %, at least 14 wt. %, at least 15 wt. %, at least 16 wt. %, at least 17 wt. %, at least 18 wt. %, at least 19 wt. %, at least 20 wt. %, at least 21 wt. %, at least 22 wt. %, at least 23 wt. %, at least 24 wt. %, based on the total weight of the polymer composition (C).

The polyaryletherketone (PAEK) is also present in an amount of advantageously at most 80 wt. %, at most 75 wt. %, at most 70 wt. %, at most 65 wt. %, at most 60 wt. %, at most 55 wt. %, at most 50 wt. %, at most 45 wt. %, at most 44 wt. %, at most 43 wt. %, at most 42 wt. %, at most 41 wt. %, at most 40 wt. %, at most 39 wt. %, at most 38 wt. %, at most 37 wt. %, at most 36 wt. %, at most 35 wt. %, at most 34 wt. %, at most 33 wt. %, at most 32 wt. %, at most 31 wt. %, at most 30 wt. %, at most 29 wt. %, at most 28 wt. %, at most 27 wt. %, at most 26 wt. %, based on the total weight of the polymer composition (C).

Preferably, the polyaryletherketone (PAEK) is present in an amount ranging from 2 to 50 wt. %, more preferably from 3 to 45 wt. %, still more preferably from 4 to 40 wt. % and most preferably from 5 to 35 wt. %, based on the total weight of the polymer composition (C).

The polymer composition (C) according to the present invention comprises also at least two different kinds of aromatic sulfone polymers (SP), i.e any polymer, at least 50% moles of the recurring units thereof comprise at least one group of formula (SP) [recurring units ($R_{SP}$)]:

—Ar—SO$_2$—Ar'—  formula (SP)

with Ar and Ar', equal to or different from each other, being aromatic groups.

The Polyphenylsulfone (PPSU)

The polymer composition (C) comprises at least one first type of aromatic sulfone polymers (SP), called herein below polyphenylsulfone (PPSU).

By "polyphenylsulfone (PPSU)" is meant an aromatic sulfone polymer where at least 50% moles of the recurring units are recurring units (Ra):

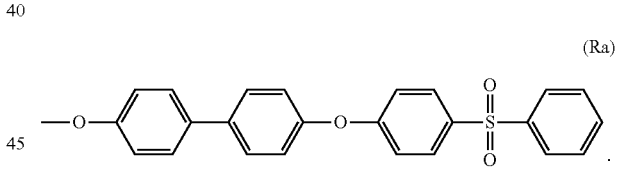

(Ra)

Preferably at least 60% moles, more preferably at least 70% moles, still more preferably at least 80% moles and most preferably at least 90% moles of the recurring units of polyphenylsulfone (PPSU) are recurring units (Ra). Excellent results were obtained when the polyphenylsulfone (PPSU) contained no recurring unit other than recurring units (Ra), such a polymer is notably available as RADEL® PPSU commercially available from Solvay Specialty Polymers USA, L.L.C.

In the polymer composition (C), the polyphenylsulfone (PPSU) is present in an amount of advantageously at least 2 wt. %, in an amount of advantageously at least 5 wt. %, preferably at least 10 wt. %, more preferably at least 15 wt. %, still more preferably at least 20 wt. %, even more preferably at least 25 wt. % and most preferably at least 30 wt. %, based on the total weight of the polymer composition (C).

The polyphenylsulfone (PPSU) is also present in an amount of advantageously at most 80 wt. %, preferably at most 70 wt. %, more preferably at most 60 wt. %, still more preferably at most 50 wt. %, even more preferably at most 40 wt. %, yet more preferably at most 38 wt. % and most preferably at most 35 wt. %, based on the total weight of the polymer composition (C).

Preferably, the polyphenylsulfone (PPSU) is present in an amount ranging from 5 to 50 wt. %, more preferably from 10 to 40 wt. %, still more preferably from 15 to 38 wt. % and most preferably from 20 to 35 wt. %, based on the total weight of the polymer composition (C).

The Polysulfone (PSU)

The polymer composition (C) comprises also at least one second type of aromatic sulfone polymers (SP), called herein below polysulfone (PSU).

By "polysulfone (PSU)" is meant an aromatic sulfone polymer where at least 50% moles of the recurring units of aromatic sulfone polymer (SP) are recurring units (Rb):

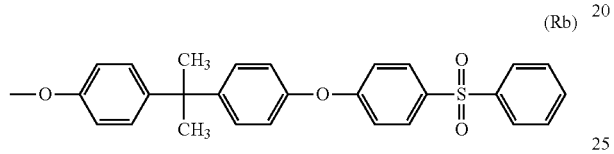
(Rb)

Preferably at least 60% moles, more preferably at least 70% moles, still more preferably at least 80% moles and most preferably at least 90% moles of the recurring units of polysulfone (PSU) are recurring units (Rb). Excellent results were obtained when the polysulfone (PSU) contained no recurring unit other than recurring units (Rb), such a polymer is notably available as UDEL® PSU commercially available from Solvay Specialty Polymers USA, L.L.C.

In the polymer composition (C), the polysulfone (PSU) is present in an amount of advantageously at least 10 wt. %, preferably at least 15 wt. %, more preferably at least 20 wt. %, still more preferably at least 25 wt. %, even more preferably at least 30 wt. % and most preferably at least 35 wt. %, based on the total weight of the polymer composition (C).

The polysulfone (PSU) is also present in an amount of advantageously at most 80 wt. %, preferably at most 70 wt. %, more preferably at most 65 wt. %, still more preferably at most 60 wt. %, even more preferably at most 55 wt. %, yet more preferably at most 50 wt. % and most preferably at most 45 wt. %, based on the total weight of the polymer composition (C).

Preferably, the polysulfone (PSU) is present in an amount ranging from 10 to 60 wt. %, more preferably from 15 to 55 wt. %, still more preferably from 20 to 50 wt. % and most preferably from 25 to 45 wt. %, based on the total weight of the polymer composition (C).

As explained above, both the polysulfone (PSU) and the polyphenylsulfone (PPSU) can comprise at most 50% moles of recurring units different from recurring units (Ra) and (Rb), respectively.

In particular, they can comprise recurring units (Rc), different from the above mentioned recurring units (Ra) and (Rb), complying with formula:

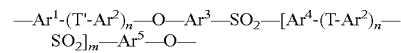

wherein:

$Ar^1$, $Ar^2$, $Ar^a$, $Ar^4$, and $Ar^y$, equal to or different from each other and at each occurrence, are independently a aromatic mono- or polynuclear group;

T and T', equal to or different from each other and at each occurrence, is independently a bond or a divalent group optionally comprising one or more than one heteroatom; preferably T' is selected from the group consisting of a bond, $-CH_2-$, $-C(O)-$, $-C(CH_3)_2-$, $-C(CF_3)_2-$, $-C(=CCl_2)-$, $-SO_2-$, $-C(CH_3)(CH_2CH_2COOH)-$, and a group of formula:

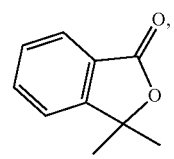

and preferably, T is selected from the group consisting of a bond, $-CH_2-$, $-C(O)-$, $-C(CH_3)_2-$, $-C(CF_3)_2-$, $-C(=CCl_2)-$, $-C(CH_3)(CH_2CH_2COOH)-$, and a group of formula:

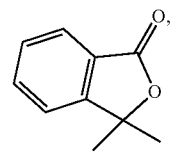

and n and m, equal to or different from each other, are independently zero or an integer of 1 to 5.

Recurring units (Rc) can be notably selected from the group consisting of those of formulae (S-A) to (S-D) herein below:

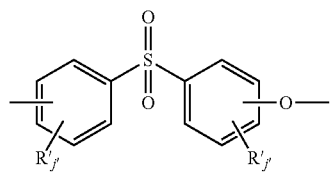
(S-A)

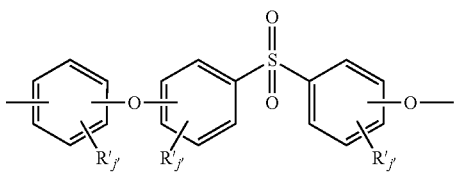
(S-B)

-continued

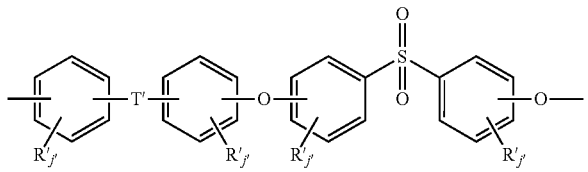
(S-C)

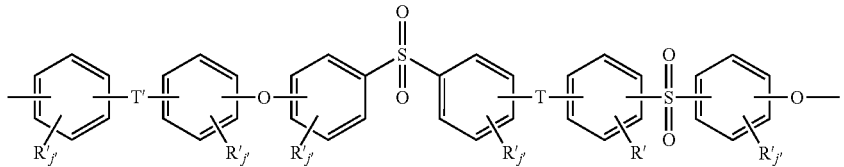
(S-D)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other are a bond or a divalent group optionally comprising one or more than one heteroatom; preferably T' is selected from the group consisting of a bond, —$CH_2$—, —C(O)—, —$C(CH_3)_2$—, —$C(CF_3)_2$—, —$C(=CCl_2)$—, —$C(CH_3)(CH_2CH_2COOH)$—, —$SO_2$—, and a group of formula:

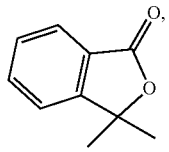

and preferably T is selected from the group consisting of a bond, —$CH_2$—, —C(O)—, —$C(CH_3)_2$—, —$C(CF_3)_2$—, —$C(=CCl_2)$—, —$C(CH_3)(CH_2CH_2COOH)$—, and a group of formula:

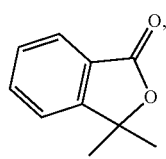

and recurring units ($R_c$) may be selected from the group consisting of the recurring units of formulas (i) to (iv) and (j) to (jv) detailed below:

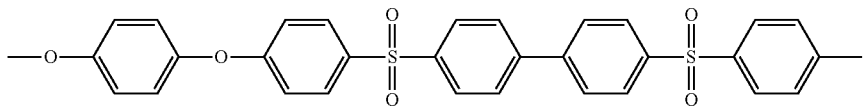
(i)

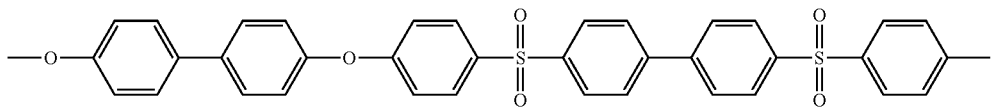
(ii)

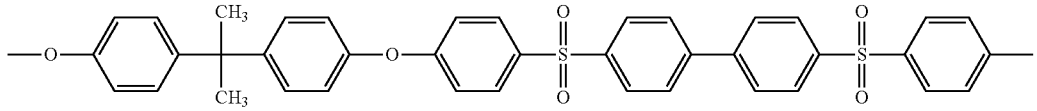
(iii)

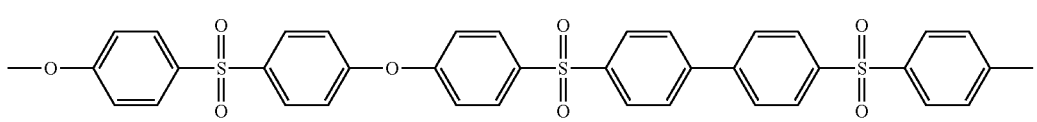
(iv)

-continued

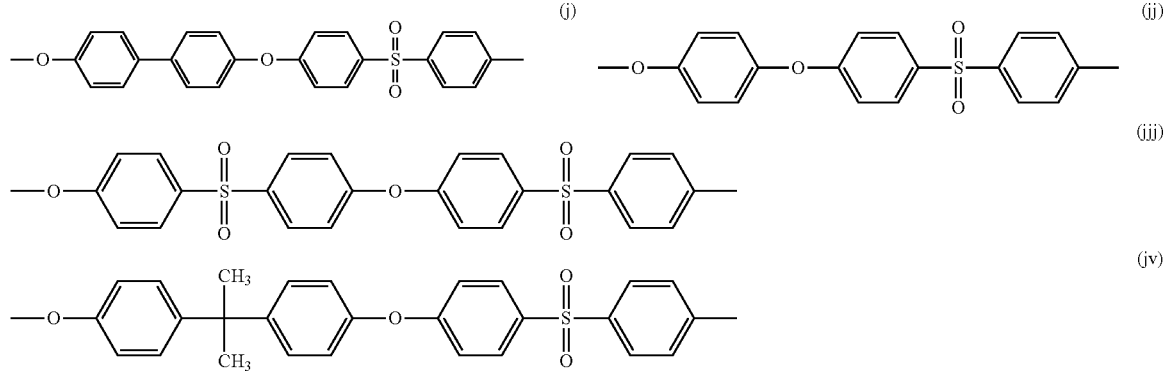

and mixtures thereof.

High Modulus Glass Fibers

The polymer composition (C) also comprises high modulus glass fibers having an elastic modulus (also called tensile modulus of elasticity) of at least 76, preferably at least 78, more preferably at least 80, and most preferably at least 82 GPa as measured according to ASTM D2343.

Glass fibers are silica-based glass compounds that contain several metal oxides which can be tailored to create different types of glass. The main oxide is silica in the form of silica sand; the other oxides such as calcium, sodium and aluminium are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers, whereas chopped glass fibers are preferred. The glass fibers have generally an equivalent diameter of 5 to 20 µm preferably of 5 to 15 µm and more preferably of 5 to 10 µm.

R, S and T glass fibers are well known examples of high modulus glass fibers. They are notably described in *Fiberglass and Glass Technology*, Wallenberger, Frederick T; Bingham, Paul A. (Eds.), 2010, XIV. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. High modulus glass fibers used in the composition (C) of the present invention are thus distinguishable from traditional E-glass fibers, which are widely used in polymer compositions. Actually, contrarily to said E-glass fibers, R, S and T glass fibers comprise less than 10 wt. % of CaO.

In the polymer composition (C), the glass fibers having an elastic modulus of at least 76 GPa are present in an amount of advantageously at least 5 wt. %, preferably at least 10 wt. %, more preferably at least 15 wt. %, still more preferably at least 20 wt. %, even more preferably at least 25 wt. %, yet even more preferably at least 26 wt. %, and most preferably at least 28 wt. %, based on the total weight of the polymer composition (C).

The glass fibers having an elastic modulus of at least 76 GPa are also present in an amount of advantageously at most 50 wt. %, preferably at most 45 wt. %, more preferably at most 40 wt. %, still more preferably at most 35 wt. %, even more preferably at most 34 wt. %, and most preferably at most 32 wt. %, based on the total weight of the polymer composition (C).

Preferably, glass fibers having an elastic modulus of at least 76 GPa are present in an amount ranging from 20 to 40 wt. %, more preferably from 25 to 35 wt. %, still more preferably from 26 to 34 wt. % and most preferably from 28 to 32 wt. %, based on the total weight of the polymer composition (C).

Excellent results were obtained when the glass fibers having an elastic modulus of at least 76 GPa were chopped S-glass fibers. Such glass fibers are notably commercially available as 401 S-2 GLASS® CHOPPED STRANDS from AGY.

Optional Ingredients

The polymer composition (C) may further optionally comprise additional additives such as ultraviolet light stabilizers, heat stabilizers, antioxidants, pigments, processing aids, lubricants, flame retardants, and/or conductivity additive such as carbon black and carbon nanofibrils.

The polymer composition (C) may also further comprise other polymers than the polyaryletherketone (PAEK) and the aromatic sulfone polymers (SP). In particular, the polymer composition (C) may further comprise polymers such as polyetherimide, polyphenylsulfide and/or polycarbonate.

The polymer composition (C) may further comprise flame retardants such as halogen and halogen free flame retardants.

In a preferred embodiment of the present invention, the composition (C) of the invention comprises, consists essentially of:
from 5 to 35 wt. % of at least one (PEEK) polymer,
from 5 to 35 wt. % of at least one (PPSU) polymer,
from 25 to 65 wt. % of at least one (PSU) polymer,
from 25 to 35 wt. % of glass fibers, and wherein all % are based on the total weight of the composition (C).

The preparation of the polymer composition (C) can be carried out by any known melt-mixing process that is suitable for preparing thermoplastic molding compositions. Such a process is typically carried out by heating the thermoplastic polymer above the melting temperature of the thermoplastic polymer thereby forming a melt of the thermoplastic polymer. The process for the preparation of the composition (C) can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the polymer composition (C) the constituting components for forming the composition are fed to the melt-mixing apparatus and melt-mixed in that apparatus. The constituting components may be fed simultaneously as a powder mixture or granule mixer, also known as dry-blend, or may be fed separately.

Another aspect of the present invention is related to articles comprising the above described polymer composition (C).

The articles according to the present invention are made from the polymer composition (C) using any suitable melt-processing method. In particular, they are made by injection molding or extrusion molding. Injection molding is a preferred method.

The polymer composition (C) is notably very well suited for the manufacture of articles useful in a wide variety of end uses.

Non limitative examples of articles according to the present invention are:
- plumbing articles used for the transportation of water or other fluids under pressure such as fittings, rings, faucets, valves and manifolds. Common applications thereof include domestic hot and cold water, radiator heating systems, floor and wall heating and cooling systems, compressed air systems and piping systems for natural gas;
- medical/dental/healthcare articles such as medical instruments or parts of instruments (notably handles and viewing glasses), components of medical equipments that handle or dispense chemicals used in medical procedures (such as anesthesia), cases and trays used to hold such instruments;
- aircraft interiors articles such as panels and components (ducts, wire coatings, etc) on aircraft;
- food service articles such as warming trays, steam table trays, plastic cook ware;
- dairy equipment articles such as piping systems used for the collection or transportation of milk and other dairy products;
- laboratory animal cages;
- laboratory equipment articles such as funnels, filter device and other lab equipments;
- electronic articles such as structural parts of electronic devices.

The Applicant has surprisingly found that the incorporation of a stiffer reinforcement material than the regular E-glass fiber commonly used in the art of thermoplastic blends improves the elongation properties of the above mentioned blends of PAEK, PPSU and PSU. Usually the introduction of stiff material in polymer compositions improves some mechanical properties such as the toughness, the tensile strength and modulus but this is done by sacrificing the elongation and impact resistance properties on the other side.

The polymer composition (C) features thus an exceptional set of properties which makes it very attractive for numerous end-uses.

Should the disclosure of any patents, patent applications, and publications which are incorporated herein by reference conflict with the description of the present application to the extent that it may render a term unclear, the present description shall take precedence.

EXAMPLES

The invention will be now described in more details with reference to the following examples, whose purpose is merely illustrative and not intended to limit the scope of the invention.

Raw Materials

KETASPIRE® KT-880 [MV (400° C., 1000 $s^{-1}$) ranges from 0.12-0.18 kPa·s; IV is 0.75 dl/g-0.77 dl/g] is an aromatic polyetheretherketone (PEEK) polymers commercially available from Solvay Specialty Polymers USA, LLC.

RADEL® R 5600 PPSU from Solvay Specialty Polymers USA, L.L.C.

UDEL® P 3703 NT PSU from Solvay Specialty Polymers USA, L.L.C.

OCV 910A chopped fiberglass from Owens-Corning Vetrotex

Hostanox PEPQ, an aromatic organic phosphonite melt thermal stabilizer available from Clariant Sachtolith-L, a zinc sulfide grade available from Sachtleben Chemie GmbH Zinc oxide, grade Aktiv® available from Lanxess Corp.

General Description of the Compounding Process of the PEEK/PPSU/PSU/Glass Fiber Polymer Compositions The PEEK/PPSU/PSU/glass fibers polymer composition, as shown in Table 2, were prepared by first tumble blending pellets of the resins to be blended at the desired compositional ratios for about 20 minutes, followed by melt compounding thereby using an Berstorff 25 mm twin-screw co-rotating partially intermeshing extruder. Vacuum venting was applied at barrel section 7 during compounding to strip off moisture and any possible residual volatiles from the compound. The PEEK polymer and the PSU polymer was fed gravimetrically at the right proportion into barrel section 1 (feed throat of the extruder). Fiberglass was fed gravimetrically at the right proportion into barrel section 5. When PPSU was present in the formulation it was pre-blended in pellet form with the PSU polymer pellets and then the mixture was fed at the desired feed rate using a gravimetric feeder. The compounding conditions are summarized in Table 1 for PEEK/PPSU/PSU/glass fibers polymer compositions.

TABLE 1

Compounding process conditions used in preparing the PEEK/PPSU/PSU/glass fiber polymer compositions as shown in TABLE 2

| | Set Points |
|---|---|
| Barrel Section No. 2 | 310-315 |
| Barrel Section No. 3 | 327-332 |
| Barrel Section No. 4 | 327-332 |
| Barrel Section No. 5 | 327-332 |
| Barrel Section No. 6 | 327-332 |
| Barrel Section No. 7 | 327-332 |
| Barrel Section No. 8 | 327-332 |
| Other Extruder Set Points and Readings | |
| Adapter Temperature (° C.) | 340 |
| Die Temperature (° C.) | 340-350 |
| Melt Temperature (° C.) | 390-400 |
| Screw Speed (rpm) | 205-210 |
| Torque (% of Max Available) | 70-75 |
| Total Feed Rate (lb/hr) | 20-35 |

The mechanical properties of the polymer compositions prepared were tested according to ASTM standards. For the preparation of the test specimen, in particular 1) Type I tensile bars, 2) 5 inch×0.5 inch×0.125 inch flexural bars, and 3) 4 inch×4 inch×0.125 inch plaques for the instrumented impact (Dynatup) testing.

The polymer compositions were molded on the 150-Ton Toshiba injection molder according to the conditions as shown in Table 3.

TABLE 3

| Tensile and flex bars, and 4 × 4 × ⅛ inch plaques were made with the following conditions: | | | |
|---|---|---|---|
| ISO bars | | 4 × 4 × ⅛" plaques | |
| | Temp ° C. | | Temp ° C. |
| Zone 1 | 380 | Zone 1 | 375 |
| Zone 2 | 390 | Zone 2 | 375 |
| Zone 3 | — | Zone 3 | 365 |
| Zone 4 | 385 | Nozzle temp. | 365 |
| Zone 5 | 380 | | |
| Mold temp. | 195 | Mold temp. | 195 |

The various ASTM test methods employed were the following:
Flexural properties: D790
Tensile properties: D638
Notched Izod Impact: D256
Unnotched Izod Impact: D4812

The mechanical and thermal properties are summarized in Table 2.

TABLE 2

| Examples No | C1 | C2 | 3 | 4 | 5 | 6 | 7 | 8 | 9 | 10 |
|---|---|---|---|---|---|---|---|---|---|---|
| UDEL ® P 3703 NT PSU (% wt.) | | 100 | 41 | 55.6 | 52.7 | 49.8 | 46.9 | 43.9 | 53.4 | 47.5 |
| KETASPIRE ® KT-880 PEEK polymer (% wt.) | 100 | | 17.5 | 2.9 | 5.8 | 8.7 | 11.6 | 14.6 | 9.4 | 15.6 |
| Glass Fiber 1 (% wt.) | | | 30.0 | 30.0 | 30.0 | 30.0 | 30.0 | 30.0 | 30.0 | 30.0 |
| RADEL ® R 5600 PPSU (% wt.) | | | 6.5 | 6.5 | 6.5 | 6.5 | 6.5 | 6.5 | 6.9 | 6.9 |
| Other ingredients (PepQ, ZnS, ZnO) (% wt.) | | | 5 | 5 | 5 | 5 | 5 | 5 | 0.3 | 0.3 |
| Polymer composition (C) properties | | | | | | | | | | |
| Tensile Strength (MPa) | 162.00 | 110.0 | 145.9 | 138.0 | 144 | 146.0 | 146.0 | 148.0 | 146.0 | 146.0 |
| Tensile Modulus (GPa) | 10.8 | 7.4 | 9.8 | 9.4 | 9.6 | 9.7 | 9.7 | 9.9 | 9.0 | 9.1 |
| Tensile Elongation (%) | 2.80 | 2.0 | 2.8 | 2.7 | 2.8 | 2.8 | 2.9 | 2.8 | 3.2 | 3.1 |
| Flexural Strength (MPa) | 260.0 | 154.0 | 219.5 | 198.0 | 216.0 | 216.0 | 216.0 | 217.0 | 228.5 | 228.0 |
| Flexural Modulus (GPa) | 10.5 | 7.6 | 9.3 | 9.2 | 9.4 | 9.5 | 9.4 | 9.6 | 9.2 | 9.3 |
| Flexural Elongation (%) | | 2.0 | 2.9 | 2.5 | 2.7 | 2.8 | 2.8 | 2.7 | 3.1 | 3.1 |
| Notched Izod Impact (J/m) | 910.0 | | 824.2 | 681.0 | 835.0 | 844.0 | 878.0 | 878.0 | 948.0 | 941.0 |
| Unnotched Izod Impact (J/m) | 90.0 | 69.0 | 100 | 94 | 102 | 104 | 101 | 101 | 117 | 116 |

The invention claimed is:

1. A polymer composition, comprising:
   at least one polyaryletherketone;
   at least one polyphenylsulfone;
   at least one polysulfone; and
   glass fibers having an elastic modulus of at least 76 GPa as measured according to ASTM D2343,
wherein:
polyphenylsulfone is an aromatic sulfone polymer where at least 50% moles of the recurring units are recurring units (Ra):

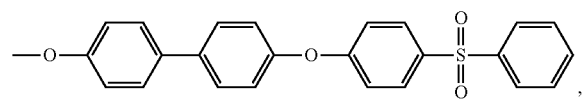

(Ra)

and
polysulfone is an aromatic sulfone polymer where at least 50% moles of the recurring units of aromatic sulfone polymer (SP) are recurring units (Rb):

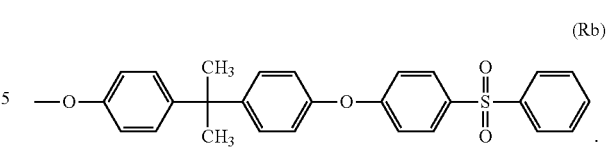

(Rb)

2. The polymer composition according to claim 1, wherein at least 50% moles of recurring units of the polyaryletherketones are the recurring units (J'-A):

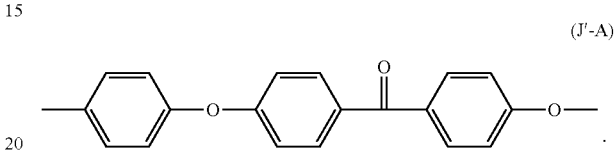

(J'-A)

3. The polymer composition according to claim 1, wherein the polyaryletherketone is present in an amount of at least 2 wt. %, based on the total weight of the polymer composition.

4. The polymer composition according to claim 1, wherein the polyaryletherketone is present in an amount of at most 50 wt. %, based on the total weight of the polymer composition.

5. The polymer composition according to claim 1, wherein at least 90% moles of the recurring units of the polyphenylsulfone are the recurring units (Ra).

6. The polymer composition according to claim 1, wherein the polyphenylsulfone is present in an amount of at least 5 wt. %, based on the total weight of the polymer composition.

7. The polymer composition according to claim 1, wherein the polyphenylsulfone is present in an amount of at most 50 wt. %, based on the total weight of the polymer composition.

8. The polymer composition according to claim 1, wherein at least 90% moles of the recurring units of the polysulfone are the recurring units (Rb).

9. The polymer composition according to claim 1, wherein the polysulfone is present in an amount of at least 10 wt. %, based on the total weight of the polymer composition.

10. The polymer composition according to claim 1, wherein the polysulfone is present in an amount of at most 60 wt. %, based on the total weight of the polymer composition.

11. The polymer composition according to claim 1, wherein the glass fibers are present in an amount of at least 10 wt. %, based on the total weight of the polymer composition.

12. The polymer composition according to claim 1, wherein the glass fibers are present in an amount of at most 40 wt. %, based on the total weight of the polymer composition.

13. The polymer composition according to claim 1, wherein the polymer composition further comprises polyetherimide, polyphenylsulfide, and/or polycarbonate.

14. An article comprising the polymer composition according to claim 1.

15. The article according to claim 14, wherein the article is selected from the group consisting of a pipe, a fitting, a manifold, a valve, a medical instrument or part of instrument, a medical case or tray, an aircraft interior panel or component, a cookware, a laboratory animal cage, a laboratory equipment, and a structural part of an electronic device.

16. The polymer composition according to claim 1, comprising:
    from 2 to 50 wt. % of the at least one polyaryletherketone,
    from 5 to 50 wt. % of the at least one polyphenylsulfone,
    from 10 to 60 wt. % of the at least one polysulfone, and
    from 10 to 40 wt. % of the glass fibers,
    wherein the wt. % are based on the total weight of the polymer composition.

17. The polymer composition according to claim 1, wherein the glass fibers have an elastic modulus of at least 82 GPa as measured according to ASTM D2343.

18. The polymer composition according to claim 1, wherein the glass fibers are R, S and T glass fibers.

19. The polymer composition according to claim 1, wherein the glass fibers comprise from 16 to 28 wt. % of $Al_2O_3$.

* * * * *